United States Patent Office 2,906,142
Patented Sept. 29, 1959

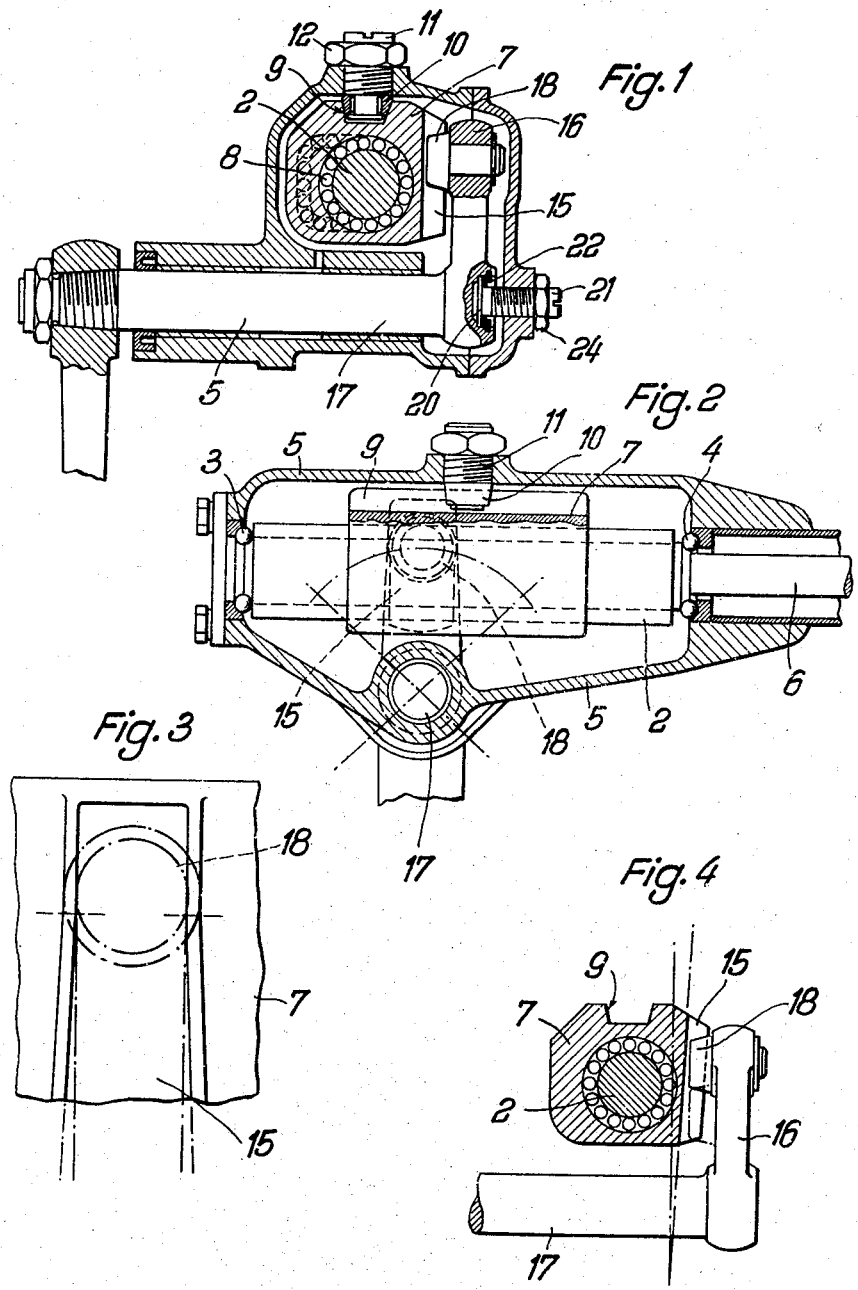

2,906,142

STEERING MECHANISM

Heinrich Wagner, Schwabisch Gmund, Germany, assignor to Zahnradfabrik Friedrichshafen Aktiengesellschaft, Friedrichshafen am Bodensee, Germany Application September 20, 1957, Serial No. 685,125

Claims priority, application Germany October 2, 1956

5 Claims. (Cl. 74—499)

This invention relates to steering mechanisms and, more particularly, to a worm and nut arrangement which connects the steering shaft with the steering rods.

It is an object of the invention to provide a simple and rugged device comprising a worm and nut for a transmitting force between a steering shaft and the steering links of a vehicle.

It is a further object of the invention to provide play in the device to a predetermined extent when steering around curves, omitting such play in straightforward driving.

It is an additional feature of the invention to provide a device of the kind described possessing a certain amount of mechanical advantage over and above that provided by the worm and nut.

It is a still further object of the invention to provide adjustability of certain critical parts of the invention so as to predetermine the amount of play and also the stress on various components.

It is an even further object of the invention to provide mechanism having a symmetrical arrangement of components so that the forces exerted are equal in either direction of steering.

Another object of the invention is to provide a construction such that no jamming of the mechanism can take place at the extreme ends of travel of any component in turning sharp curves.

Other objects and features of the invention will be apparent from the detailed description to follow.

In general, my invention comprises a worm rotatable by a steering shaft and carrying a nut which is constrained to non-rotary longitudinal movement. One side of the nut is slotted to coact with an arm pivotally mounted on a stub shaft which stub shaft actuates the steering linkage. The arm has a conical roller engaged in the slot so that, as the worm effects reciprocal motion of the nut, the arm rocks in one direction or the other to rotate the stub shaft for left or right hand turns. In one construction, the slot in which the conical roller is engaged has initially parallel walls between which the roller has no play in straightforward driving, which walls taper slightly away from each other toward one end of the slot. When the nut reciprocates in either direction, the tapered portion of the slot, which is wider than the parallel wall portion, engages the conical roller, either tapered wall edge abutting the roller depending upon the direction of turn. The roller, between the tapered wall portions affords play for the arm. In another construction, the slot is arranged somewhat askew of the path of travel of the nut so that the walls abut the roller along different portions of the conic surface. Due to the conicity of the roller, play between the roller and the slot wall edges is effected as determined by the distance that the nut moves in either direction from a central or straightforward driving position.

A detailed description now follows in conjunction with the appended drawing, in which:

Figure 1 is an axial section showing the basic components of the invention;

Figure 2 is a longitudinal view partially in section through the line 2—2 of Figure 1;

Figure 3 is an enlarged view of one of the components; and

Figure 4 is an axial cross-section showing a modification of certain components.

Referring now to Figures 1, 2 and 3, the invention comprises a steering worm 2 keyed to a steering shaft 6 which shaft is mounted in bearings 3 and 4 carried in a housing 5. Reciprocally carried on the worm is a nut 7, there being an arrangement of ball bearings 8 between the nut and the worm of a conventional nature. The nut is provided with a longitudinal groove 9 of trapezodial cross-section, as shown, the walls of which are engaged by a conical roller 10 mounted on a threaded pin 11 and adjustably carried on the housing for adjustment, it being understood that pin 11 can be held in any adjusted position by tightening the nut 12. Thus, it will be apparent that the nut 7 is constrained to longitudinal motion and that the pressure on ball bearings 8 may be maintained as desired by adjustment of roller 10.

Machined into the side of the nut perpendicularly to the nut axis is a slot 15, the upper portion of the walls of which are parallel, as shown in Figure 3; the lower portion of the walls taper slightly outwardly a predetermined extent, depending upon the amount of play desired in turning curves, as will be hereinafter apparent.

Engaged in slot 15 is a conical roller 18 carried by a steering arm 16 secured to a stub shaft 17 which will be understood to actuate the steering linkage of a vehicle. Thus, the arm 16 in rocking in or out of the plane of the paper, as viewed on Figure 1, will rotate stub shaft 17, the rocking of arm 16 being effected by travel of nut 7 into or out of the plane of the paper, as viewed on Figure 1, or to the left or right, as viewed on Figure 2.

The position of roller 18 with respect to the wall edges of the slot 15 is adjustable by means of a pin 21 having an end rotatably secured axially within the end of the stub shaft 17, and threadedly carried by the housing. Securement of pin 21 with the arm and stub shaft is effected by means of a lock washer 22 and spacing washer 23, as shown. Pin 21 has a kerf by which the pin may be adjusted axially, a jam nut 24 locking the pin in any adjusted position. Accordingly, by means of the pin 21, any particular portion of conical roller 18 may be brought to bear against the respective outer edge of the walls of slot 15, the conicity of the roller thereby effecting initial tightness as desired, since the roller being larger towards its base will move into closer contact with the wall edges as the arm is adjusted toward the left, as viewed in Figure 1.

As is seen on Figure 3, the roller 18 is represented as engaging the parallel portion of slot 15, arm 16 being in central position for straight driving. However, due to the widening of the slot at its lower portion, when the arm 16 is rocked, roller 18 moves into the widened portion of the slot thereby effecting play between itself and the engageable edges of the slot walls. This occurs when the arm is moved by nut 7 in or out of the plane of the paper, as viewed on Figure 1, it being understood that the nut always moves axially along the worm and is constrained to linear motion. Thus, for a predetermined degree, depending on the length of the straight parallel portions of slot 15, the steering arm 16 is permitted no play for straight driving. However, as steering is effected, play between the arm and the nut is permitted, the greatest play being at the extreme points of travel of the nut in turning either to the left or to the right. The amount of play may be adjusted by taking advantage of the conicity of roller 18 upon adjustment of pin 21, adjusted so that roller 18 has initially no play in central position in the straight position of the slot 15. However, if some play can be permitted in central position, it will be understood that increased play can be achieved at the extreme positions.

It will be noted that the longitudinal length of arm 16 is such that the center line of roller 18 is above the axis of worm 2. Thus, an increased length of arm can be utilized for mechanical advantage, as will be readily apparent. Further, due to the completely symmetrical arrangement of the nut 7, slot 15 and arm 16, the forces involved in steering either to the left or to the right are equal, insofar as the mechanism of the invention is concerned.

In the form of the invention shown in Figure 4, all reference characters apply as heretofore set forth in conjunction with Figures 1 to 3. In this instance, slot 15 is set at an askew angle with respect to the plane of motion of nut 7. Thus the edges E of the walls of slot 15 are at an angle of 1° or 2° with respect to the axis of roller 18. Accordingly, it will be apparent that as the arm 16 swings in or out of the plane of the paper the increasingly narrowed portion of the roller engages either edge E, depending on direction of rocking, thereby effecting play of the roller between the walls of the slot. In this instance, the walls of the slot are parallel.

Having thus described my invention, I am aware that various changes may be made without departing from the spirit thereof and, accordingly, I do not seek to be limited to the precise illustrations herein given, except as set forth in the appended drawing, I claim:

1. In a steering mechanism for motor vehicles, a fixed housing, a worm, a nut element threadedly engaged on said worm, and guide means on said nut element and said housing to constrain said nut element to longitudinal movement with respect to said worm, a steering arm element rockable on an axis transverse of the axis of the worm and engaging said nut element; whereby reciprocal motion of said nut element rocks said steering arm in one direction or the other, and means intermediate said nut element and said steering arm element comprising a pair of spaced walls on one of said elements and a mating element on the other of said elements, said mating element being disposed intermediate said walls and engageable therewith on respective predetermined surfaces thereof whereby motion of said nut element effects rocking motion of said steering arm element, said predetermined surfaces being inclined so as to effect play between said walls and said mating element when said steering arm is rocked to either side of its central position.

2. In a mechanism as set forth in claim 1, said walls being initially parallel for a predetermined portion corresponding to a substantially central position of said steering arm element and subsequently sloped away from each other for a predetermined portion corresponding to a position of said steering arm element when rocked to either side of said central position.

3. In a device as set forth in claim 1, said mating element being a conical roller, the smaller end of said roller protruding into the space between said walls, and means for adjusting the axial position of said roller in said space.

4. In a mechanism as set forth in claim 1, said walls being carried by said nut element and said roller being carried by said steering arm element.

5. In a mechanism as set forth in claim 1, wherein said mating element is a conical roller and meets both of said walls toward the base of conicity in a central position of said steering arm element, said walls being parallel and said surfaces comprising edges sloped with respect to a plane perpendicular to the rocking axis of said steering arm element to effect play with said roller toward the apex of conicity as said steering arm element rocks in either direction from said central position.

References Cited in the file of this patent

UNITED STATES PATENTS

| | | |
|---|---|---|
| 1,426,915 | Schmaller | Aug. 22, 1922 |
| 1,899,663 | Bishop | Feb. 28, 1933 |
| 1,967,482 | Schmidt | July 24, 1934 |
| 2,145,751 | Briggs | Jan. 31, 1939 |
| 2,648,995 | Doerfner | Aug. 18, 1953 |
| 2,654,265 | Nallinger | Oct. 6, 1953 |
| 2,780,943 | Stump | Feb. 12, 1957 |

FOREIGN PATENTS

| | | |
|---|---|---|
| 509,126 | Great Britain | July 11, 1939 |
| 596,268 | Great Britain | Dec. 31, 1947 |
| 698,778 | Great Britain | Oct. 21, 1953 |